United States Patent [19]

Schaefer

[11] Patent Number: 5,098,794

[45] Date of Patent: Mar. 24, 1992

[54] LAMINATES AND LAMINATED TUBES AND PACKAGES FOR HARD-TO-HOLD PRODUCTS HAVING VOLATILE COMPONENTS

[75] Inventor: Suzanne E. Schaefer, Neenah, Wis.

[73] Assignee: American National Can Company, Chicago, Ill.

[21] Appl. No.: 273,015

[22] Filed: Nov. 22, 1988

Related U.S. Application Data

[63] Continuation-in-part of Ser. No. 132,833, Dec. 14, 1987.

[51] Int. Cl.$^5$ .............................................. B32B 15/08
[52] U.S. Cl. ...................................... 428/457; 428/461; 428/500; 428/516
[58] Field of Search ............... 428/516, 337, 457, 461, 428/500; 222/107; 53/452; 156/69

[56] References Cited

U.S. PATENT DOCUMENTS

| | | | |
|---|---|---|---|
| 2,430,046 | 11/1947 | Dreyfus | 222/107 |
| 3,347,419 | 10/1967 | Brandt | 222/107 |
| 3,690,088 | 9/1972 | Anderson et al. | 53/452 |
| 3,700,513 | 10/1972 | Haberhauer et al. | 156/69 |
| 3,740,306 | 6/1973 | Kosbab et al. | 428/461 |
| 3,817,427 | 6/1974 | Neff et al. | 222/107 |
| 3,949,114 | 4/1976 | Viola et al. | 428/337 |
| 3,958,721 | 5/1976 | Kushida et al. | 222/107 |
| 4,011,968 | 3/1977 | McGhie | 222/107 |
| 4,659,408 | 4/1987 | Redding | 428/461 |
| 4,685,591 | 8/1987 | Schaefer et al. | 222/107 |
| 4,769,261 | 9/1988 | Hazelton et al. | 428/516 X |

FOREIGN PATENT DOCUMENTS

| | | |
|---|---|---|
| 57954 | 1/1987 | Australia . |
| 69269 | 9/1987 | Australia . |
| 70471 | 9/1987 | Australia . |
| 0165791 | 12/1985 | European Pat. Off. . |
| 1464718 | 5/1974 | United Kingdom . |
| 2023088A | 12/1979 | United Kingdom . |
| 2116187A | 9/1983 | United Kingdom . |

Primary Examiner—Thomas J. Herbert, Jr.
Attorney, Agent, or Firm—Robert A. Stenzel; Mary J. Schnurr

[57] ABSTRACT

Sheet materials and packages capable of holding hard-to-hold products such as methyl salicylate. The preferred embodiments include a foil layer 12 and a layer 14 of EVOH between foil layer 12 and the enclosed product. A carboxy modifed adhesive layer 18 is disposed between the EVOH layer 14 and the product 52. Additional layers are used in the sheet material for purposes of adhesion, appearance, protection, body, and the like. One embodiment of the invention is a coextruded film comprising the EVOH layer 514, a surface layer 516, an intervening adhesive layer 518, and a fourth covering layer 519 for covering and protecting the EVOH layer 514, especially from physical abuse. The sheet materials of the invention may be made into packages using fin seals 54 and lap seals 50.

22 Claims, 2 Drawing Sheets

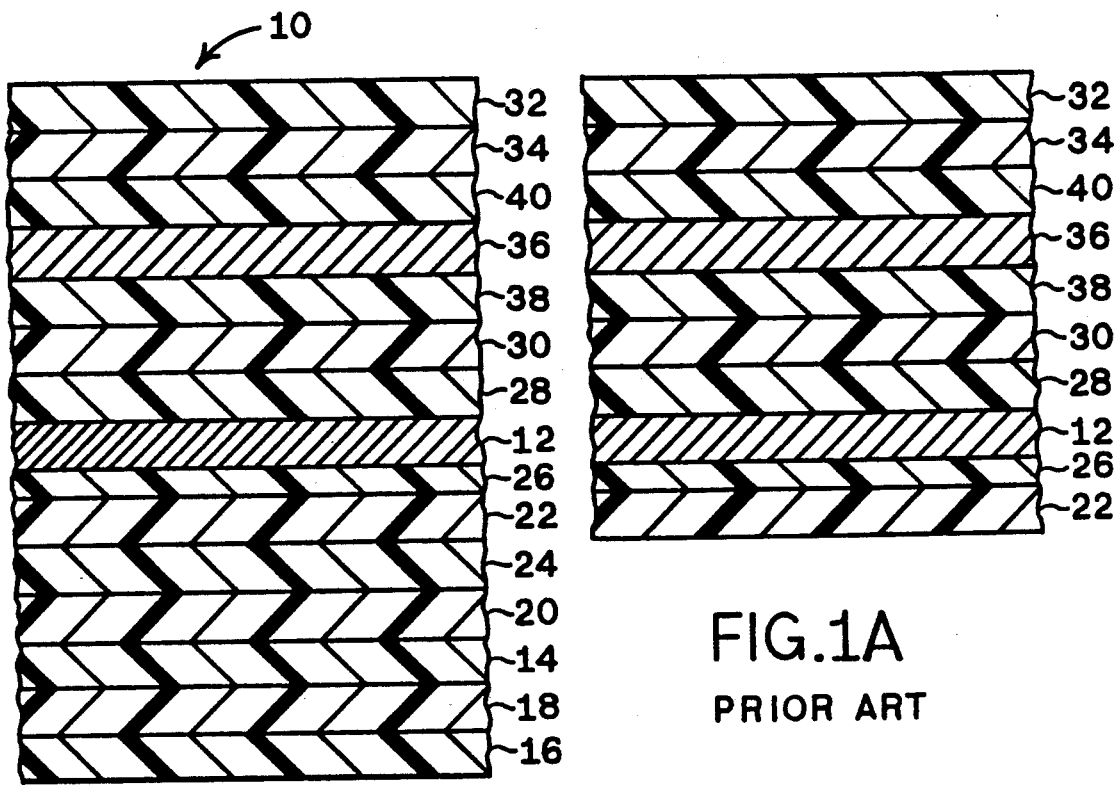
FIG. 1
FIG. 1A PRIOR ART
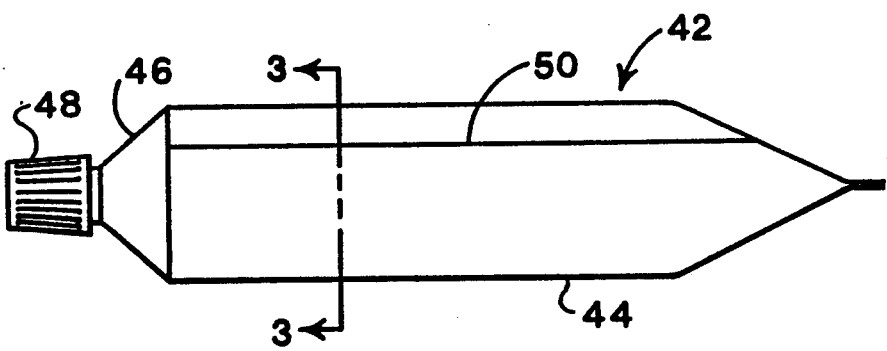
FIG. 2

LAMINATES AND LAMINATED TUBES AND PACKAGES FOR HARD-TO-HOLD PRODUCTS HAVING VOLATILE COMPONENTS

This application is a continuation-in-part of application Ser. No. 07/132,833 filed Dec. 14, 1987 now pending.

BACKGROUND OF THE INVENTION

This invention pertains to laminated sheet materials used for packaging. Such sheet materials are commonly known for their use in making bags, pouches, and tubes. The sheet materials of the invention can be used for making any of these types of packages. This particular description will be addressed primarily to the discussion of the sheet materials as they relate to packaging products in lap seamed tubes.

Laminated sheet materials of the variety disclosed herein, and especially those containing a layer of metal foil, have been used for packaging such materials as toothpaste, foods, and certain chemical compounds. There remain certain products which have not heretofore been packaged in multiple layer sheet materials of the type disclosed in the invention because of the package's susceptibility to being chemically attacked by the contained product. Particularly troublesome, and addressing now the problem addressed by the inventors herein, are those compounds which use especially volatile, and chemically active, materials such as methyl salicylate.

Conventional sheet materials of the type disclosed in this invention contain a barrier layer of aluminum foil, and protective, covering, sealing, bonding, and the like layers of polymeric materials on both sides of the aluminum foil. It has been found unsatisfactory to package products containing methyl salicylate in known sheet materials of this type because methyl salicylate penetrates through the intervening polymeric layers and attacks the interfacial adhesion on the product side of the metal foil layer. The attack on the metal foil interfacial adhesion is effective to cause delamination of the sheet material, and subsequent failure of the package.

There are a number of advantages to the laminated type of sheet material of the invention over the otherwise conventionally used packages of metal foil. The conventional tubes of metal foil, which are used for packaging these hard-to-hold products, have a number of disadvantages. Among the disadvantages are the thickness of the metal foil which is used, and its associated tendency to crack upon repeated flexing. Metal foil tubes are also more expensive. While such disadvantages have been known for quite some time, there has not, in the past, been a satisfactory substitute material for use in packaging the materials addressed by the inventions herein.

Thus it would be highly desirable to find a functionally acceptable material which can be used to package materials which attack the more conventional multiple layer sheet materials which are used in packages of this type.

It is an object of this invention to provide multiple layer sheet materials capable of holding such a volatile material as methyl salicylate in combination with a metal foil which provides a high barrier to the transmission of product components through the package wall.

It is another object of the invention to provide a multiple layer sheet material which is capable of holding certain volatile materials, without delaminating, over the typical life of the product.

It is still another object of the invention to provide a multiple layer sheet material which is capable of holding products containing methyl salicylate and similar materials for the expected shelf life of the product without significant loss of any of the volatile components, and the resulting change in the product composition.

SUMMARY OF THE INVENTION

A preferred embodiment of the invention is seen in a sheet material which comprises at least five layers. The first layer is comprised of a metal foil, preferably aluminum foil, having a first primed surface and a second surface opposite the first primed surface. A second layer of ethylene vinyl alcohol has a first surface disposed toward the first foil layer and a second surface disposed away from the foil layer. A third adhesive means between the first and second layers adheres those first and second layers to each other. A fourth protective layer is disposed on the second surface of the first foil layer, to provide protection of the foil from physical abuse. A fifth covering layer is disposed on the second surface of the second layer of ethylene vinyl alcohol. Preferably the fifth layer is composed of a heat sealable polymer such as linear low density polyethylene. Linear low density polyethylene is a copolymer of ethylene and an α-olefin containing at least three carbon atoms, and is available from, for example, Dow Chemical Company.

The third adhesive means comprises one or more layers of material which are capable of bonding the first layer of foil to the second layer of ethylene vinyl alcohol. The adhesive means preferably comprises four separate components. The first component is a layer of ethylene acrylic acid adhered to the first surface of the foil layer through a second component of a primer containing a chromium complexed polyacrylic acid. The second component primer comprises the surface priming on the first layer of metal foil. The third component is an anhydride modified polymer containing an olefinic base resin such as a polyethylene or a polyethylene copolymer, especially linear low density polyethylene. The third component of the adhesive means is bonded to the first surface of the EVOH layer. The fourth component of the preferred adhesive means is a layer of low density polyethylene disposed between the olefinic adhesive on the EVOH and the EAA.

A sixth layer of adhesive is preferably disposed between the second and fifth layers of the sheet material. The olefinic adhesive layer between the second ethylene vinyl alcohol layer and the low density polyethylene layer of the third adhesive means can be considered a seventh layer of the sheet material.

In preferred embodiments, the overall thickness of the sheet material is between 0.1 and 0.6 mm.

With respect to the ethylene vinyl alcohol of the second layer, it is preferred that the vinyl alcohol component comprises 55 mole percent to 72 mole percent vinyl alcohol moieties, most preferably 60 mole percent to 64 mole percent. If the alcohol content is below the preferred range, the barrier to transmission of a volatile component such as methyl salicylate is reduced such that the layer of ethylene vinyl alcohol required to provide an equivalent barrier is undesirably thickened in order to provide the necessary level of total barrier to the methyl salicylate transmission. If the vinyl alcohol component is increased above the preferred range, the extrusive properties of the ethylene vinyl alcohol copolymer are negatively affected to the point that the extrusion process becomes difficult. Also the adhesive capabilities of the EVOH layer may be negatively affected by increased amount of alcohol in the EVOH layer. Additionally, the ethylene vinyl alcohol layer may be undesirably brittle.

It is preferred that the fifth covering layer be polymeric and that the sixth adhesive layer between the second ethylene vinyl alcohol layer and the fifth covering layer comprise a base polymeric resin, preferably an olefin resin, and anhydride comprising active anhydride component equivalent to between about 0.10% and about 0.60% by weight maleic anhydride. Preferably, the anhydride modification is between 0.26% and 0.40% (equivalent) of the weight of the composition, and most preferably between 0.30% and 0.36% of the overall weight of the composition of the adhesive polymer. It is preferred that the composition of the sixth adhesive layer have a melt index at 210° C. of between 3 and 9, preferably between 5 and 7. Further, in some cases the sixth layer may include, in addition to the base resin and the anhydride component, up to 15%, preferably up to 10%, of an elastomeric material.

It is preferred that the polymeric composition of the fifth layer and the base resin of the sixth layer both comprise linear low density polyethylene copolymers.

In preferred embodiments of the invention, the composition of the seventh layer comprises the composition of the sixth layer.

Another aspect of the sheet materials of the invention comprises essentially a five layer coextruded film containing outer surface layers of low density polyethylene and linear low density polyethylene, a core layer of ethylene vinyl alcohol, and adhesive layers, on either side of the ethylene vinyl alcohol layer, intervening between the ethylene vinyl alcohol and the respective surface layers. The five layer sheet material of this embodiment corresponds essentially to five layers on the previously recited embodiment which contains the metal foil. Those five layers are the five outermost layers of the sheet material, which five layers include the surface layer of linear low density polyethylene. The same parameters and limitations as described above apply to the five layer sheet material. That sheet material may be made, and preferably is made, by a coextrusion process.

Any of the sheet materials of the invention, including the five layer sheet material, and the more complex sheet structure containing metal foil, may be used to make packages for containing chemically active products, and especially active products having components having a high level of chemical activity in combination with the high level of volatility of at least one component.

The sheet materials of the invention include a sheet material comprising, from the inside surface thereof in the package outwardly a first layer of a polyolefin; a second adhesive layer comprising a polyethylene and about 0.10% to about 0.60%, preferably about 0.26% to about 0.40% (equivalent) of an anhydride, and having a melt index at 210° C. of between 3 and 9; and a third layer of ethylene vinyl alcohol, the packaing sheet material being functional to retard transmission of the volatile component of, for example, methyl salicylate, acetone, acetic anhydride, undecylenic acid, ichthamnol coal tar derivative, or polyurethane prepolymer, through the sheet material, sufficient to provide for acceptable compositional stability of the volatile component in the product over the normal shelf life of the product. The composition of the first layer may, in some cases, be based on propylene. In other cases, it may be based on ethylene. Further, it may be based on a combination of ethylene and propylene. Preferably it comprises a copolymer of ethylene and up to 10% of an alpha olefin, having a carbon chain at least three carbon atoms long, and commonly referred to as linear low density polyethylene.

The invention includes the method of making a package which comprises fabricating the sheet material by adhering a first layer of a covering to a second layer of metal foil, and on the surface of the foil opposite the first layer, adhering, by use of intervening adhesive means, a coextruded film structure comprising 3 or more layers and including a heat sealable layer on the surface thereof opposite the foil layer, the coextruded film structure being between 0.05 mm and 0.25 mm thick. The method further comprises fabricating the sheet material into a package enclosure by forming a tube comprising a lap seal, and with one end of the tube open. The method further comprises placing a product in the package and closing and sealing the one end to complete the fabrication, filling, and sealing of the package. The method is especially advantageous where the product contains a component capable of attacking the metal foil layer and wherein the coextruded film structure includes a layer of ethylene vinyl alcohol comprising at least about 55% vinyl alcohol, and no more than about 72% vinyl alcohol, and an adhesive layer on one surface of the ethylene vinyl alcohol layer. The adhesive layer comprises polyethylene as a base resin and about 0.10% to about 0.60%, preferably about 0.26% to about 0.40% anhydride (equivalent), the adhesive layer having a melt index, at 210° C., of between 3 and 9.

In fabrication of typical packages, portions of the sheet material are folded onto each other in a tubular configuration in formation of a lap seam, wherein an upper surface of an underlying layer is in facing contact with a lower surface of an overlying layer. A seal is fabricated by means of heating the sheet materials such that the upper surface of the underlying layer is bonded to the lower surface of the overlying layer.

In another construction useful in making packages of sheet material of the invention, the same general container shape may be fabricated using fin seals wherein portions of the same surface are brought into facing contact with each other to make the closure seals.

In still other cases, the sheet material of the invention may be used in combination with other sheet structures to fabricate less than the entire package structure. In these cases, the sheet material of the invention is typically seen as a closure, cover, or other type of lid material which is bonded to a second, and different packaging sheet material, such as a preformed rigid tray.

Another way of considering the invention is that it provides, in two layers, one of ethylene vinyl alcohol and the other of the anhydride modified polyethylene composition, preferably linear low density polyethylene, a composite barrier structure capable of holding products having one or more of the recited hard-to-hold components.

The thus made packages of the invention are entirely satisfactory, and are preferred, for packaging products having volatile components. Especially the packages made with the sheet structures containing the metal foil layer are desirably used for packaging products which have, in their composition, components which exhibit both the properties of high levels of chemical reactivity and high levels of volatility, or which are sensitive to exposure to light.

BRIEF DESCRIPTION OF THE DRAWINGS

FIG. 1 is a cross-section of a sheet material characteristic of the invention.

FIG. 1A shows a cross-section of a prior art sheet structure.

FIG. 2 shows a side-view of a typical tube package made with the sheet materials of the invention.

DETAILED DESCRIPTION OF THE ILLUSTRATED EMBODIMENTS

Figure 3:
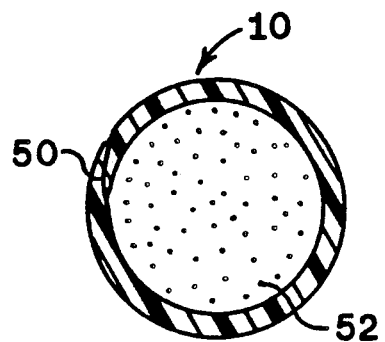
FIG. 3 is a cross-section of a tube of the invention taken at 3—3 of FIG. 2.

Referring to FIG. 1, there is seen a cross-section of sheet material 10 representative of the sheet materials of the invention. With respect to preventing the transmission of volatile product components through the packaging sheet material, it is important in some embodiments to provide a layer of metal foil 12 which serves as a barrier to transmission of many components. The interfacial adhesion on the product side of metal foil 12, however, is susceptible to being attacked by the more chemically aggressive components of some of the materials which may be packaged. Thus it is important in some cases to provide protective materials between the metal foil layer 12 and that interior surface of the package which is in contact with the product.

With respect to protecting the interfacial adhesion at metal foil layer 12, there is provided, in the FIG. 1 embodiment, a layer 14 of ethylene vinyl alcohol (EVOH), a layer 16 of linear low density polyethylene (LLDPE) on the surface of the sheet material, and a layer 18, between layers 14 and 16, of an adhesive polymer having a base resin of linear low density polyethylene and an anhydride modification.

Between the EVOH layer 14 and foil layer 12, there is provided a second adhesive layer 20, an adhesive layer 22 of ethylene acrylic acid (EAA) or ethylene methacrylic acid (EMAA), and a layer 24 of low density polyethylene (LDPE) interposed between layers 20 and 22. A chromium complexed primer, shown as layer 26 between foil layer 12 and layer 22 improves the adhesion between the foil and layer 22. A second layer 28 of EAA or EMAA is on the other surface of foil layer 12, and serves as a bonding site for the adjacent layer 30 of LDPE.

Layer 32 of LDPE is on the outside surface of the sheet material, and layer 34 of pigmented low density polyethylene is adjacent layer 32. Layer 36 of paper is bonded to LDPE layers 30 and 34 by primer, shown as layers 38 and 40, of polyethylene imine (PEI) primer.

FIG. 2 shows a tube package 42 made with the sheet material 10 of the invention. Sheet material 10 is used especially to make the sidewalls 44 of the tube. The sidewall 44, made from sheet material 10, is used in combination with the head 46 and the cap 48 in fabrication of the tube package.

FIG. 3 shows a cross-section of the tube of FIG. 2; and especially shows the typical method of joining the edges of the sheet material in fabricating the lap seam 50 which is formed along the length of the tube in joining the two edges of the sheet material to each other. FIG. 3 also shows the positioning of the packaging sheet material 10 of the tube relative to the product 52 contained therein.

Figure 4:
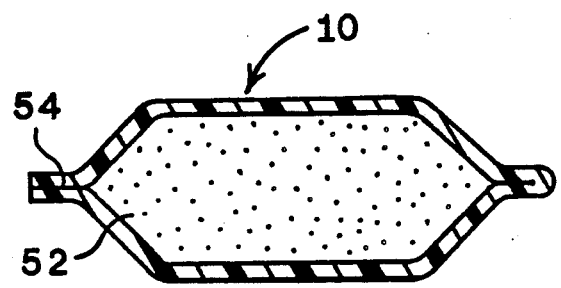
FIG. 4 is a cross-section of a typical fin-sealed package of the invention.

FIG. 4 shows a cross-section of an alternate construction of packages of the invention. In the construction illustrated in FIG. 4, the closure of facing elements of the packaging material is made by means of fin seals 54, rather than by lap seals as at 50 in the tube of FIG. 3.

Figure 5:
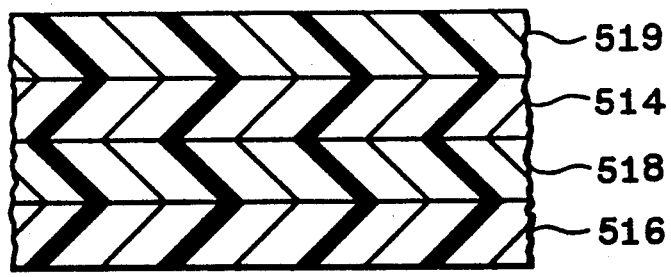
FIG. 5 is a cross-section of a less complex multiple layer film of the invention.

While the embodiments shown in FIGS. 1-4 are characteristic of the preferred embodiments of the invention, there is also seen to be novelty and utility in a simpler depiction of the invention as shown in the sheet structure of FIG. 5. With respect to the numbering of FIG. 5, the last two digits of the layer numbers in FIG. 5 correspond to the two digit numbers given for similar layers in FIG. 1. Thus layer 514 is EVOH. Layer 516 is LLDPE. Layer 518 is an adhesive comprising a base resin of LLDPE and an anhydride modifier. Layer 519 is a covering layer over layer 514, and is provided primarily for the purpose of physically protecting the EVOH in layer 514, though layer 519 may also serve other functions as well.

Returning now to FIG. 1, and a detailed discussion of how each of the layers participates in the functioning of the sheet materials and packages of the invention. As stated earlier, the objective of the invention is to provide sheet materials and packaging which are capable of successfully holding aggressive products, and especially those which have volatile and chemically active components. An especially hard to hold material is methyl salicylate. As a starting point directed toward solving the problem of packaging products containing methyl salicylate, the prior art sheet material shown in FIG. 1A was used to package a product containing methyl salicylate. As shown by the labeling of the layers in FIGS. 1 and 1A, the prior art sheet material of FIG. 1A was identical to the upper layers of FIG. 1 of the instant invention. Specifically, the layers common to both FIG. 1 and FIG. 1A are layers 12, 22, 26, 28, 30, 32, 34, 36, 38 and 40. When a methyl salicylate product was packaged in tubes made from sheet materials of FIG. 1A, the sheet material showed attack at the foil interface, evidenced by delamination of the sheet material, resulting in failure of the package to hold the product.

It appeared that the failure of the package was related to attack on the interfacial adhesion between foil layer 12 and EAA layer 22/primer 26. Thus began the search for a means to protect the foil interface from attack by the methyl salicylate. After substantial amount of testing and evaluation, it was discovered that a single layer film of EVOH provided what appeared to be an acceptable barrier to the transmission of methyl salicylate. And thus began the attempt by the applicant herein to incorporate the EVOH into the sheet material in such a way that the foil interface would be protected from attack by the methyl salicylate. To that end, experimental sheet materials were made incorporating the EVOH into the sheet material.

While respect to the layers between foil layer 12 and the outside layer 32 of the sheet material, there is no particular criticality to the sequence or composition of those layers in obtaining the foil-protecting barrier properties important to the sheet material herein. That composite of layers is shown with respect to its preferred structure. Rather, the structuring of the sheet material on that outer side of foil layer 12 is independent of the structuring with respect to providing the barrier function for protecting foil layer 12 from attack by the product. Those outer layers serve such purposes as protecting foil layer 12 from physical abuse from outside the package, for providing bulk or body to the film, for graphics, color, etc., and other means for effecting the appearance of the package. Thus their selection is made by the sheet material designer independent of the objective of protecting the foil interface from attack by chemicals in the contained product 52. Thus, in the search for a means to protect the foil interface from attack by the components of the product, various materials were added to the base prior art sheet material shown in FIG. 1A for the purpose of providing a barrier functional for the protective purpose intended.

Since it had been discovered that EVOH by itself serves as a functional barrier to the transmission of methyl salicylate, an initial attempt was made to provide a layer of EVOH between the metal foil layer 12 and the product. To this end a five layer film, coextruded by the cast coextrusion process, was laminated to the inner layer (22 of the base sheet structure represented by the prior art structure of FIG. 1A). The coextruded film which was laminated at layer 22 was as follows:

EAA/ADH/EVOH/ADH/LLDPE    (Experiment W)

The adhesive on both sides of the EVOH was Admer NF-500, an anhydride modified adhesive material based on LLDPE. The EVOH had a vinyl alcohol content of 66 mole percent. The five layer coextruded film was 0.09 mm. thick. The EAA layer of the five layer coextruded film was bonded to the EAA layer corresponding to layer 22 in FIGS. 1 and 1A. This film provided good adhesion at the foil layer, with fair adhesion between the EVOH layer 14 and the adhesive layers. The film delaminated at the EVOH/adhesive interface when methyl salicylate-containing product was stored in a package made with it. In another variable, an additional layer of LLDPE was added to the inside surface of the package. This structure, too, was not able to hold the methyl salicylate-containing product.

In another series of tests, oriented polyester was incorporated into the film in combination with the EVOH coextrusion. In this experiment, the EAA layer 22 was omitted. A layer of oriented polyester 0.012 mm thick was adhesive laminated directly to layer 12 of the foil using polyester urethane curing adhesive. The same five layer coextruded film was then adhesively laminated to the polyester using a second polyester urethane curing adhesive. Finally a layer of EAA was attached to the LLDPE surface of the coextruded film to complete the sheet structure for the trials. The final structure of the sheet material was as follows:

These materials also failed to successfully hold the methyl salicylate product.

While the initial testing of EVOH had indicated that it provided a good barrier to transmission of methyl salicylate, the initial attempts to incorporate EVOH into the sheet material and thereby provide functional protection for the foil layer 12 had failed to live up to their expectations. Thus the pursuit of the solution then headed in a direction away from EVOH. Additional sheet materials were made with polyester, which had also, in separate tests, shown a good barrier property for methyl salicylate. These too failed. Attempts were made with certain epoxies. These too failed.

Improvement was finally obtained with a coextruded structure fabricated by the tubular water quench coextrusion process. The structure was 0.09 mm. thick, and was arranged as follows:

LDPE/Adh 220/EVOH/Adh 220/LLDPE    (Experiment AW)

The LDPE and EVOH layers were each 20% of the thickness. The two adhesive layers were each 10% of the thickness. The LLDPE layer was 40% of the thickness. The adhesive 220 was a low density polyethylene based adhesive containing about of 0.14% maleic anhydride, according to the manufacturer.

After storage testing with a methyl salicylate product, the packaging material had a peel strength of about 335 grams per cm. width.

A still strong packaging structure was made using the following five layer structure, coextruded by the tubular water quench process.

LDPE/Adh 550/EVOH/Adh 550/LLDPE.    (Experiment AX)

The overall 5-layer structure was 0.09 mm. thick. The LLDPE was about 40% of the thickness. The EVOH and LDPE were each about 20%, and the Adh. 550 layers were each about 10%. These five layers represent layers 24 (LDPE), 20, 14, 18, and 16, respectively and in order, in FIG. 1. The LDPE side of the coextruded film was corona treated in line with the coextrusion process, and was subsequently extrusion laminated to the foil using EAA layer 22 0.05 mm. thick as the laminant.

Tubes were made with this sheet structure, filled with product containing methyl salicylate and storage tested for up to 3 months at up to 49° C. The tubes were 1.9 cm. diameter, 6.7 cm. in length. The tubes were tested periodically, and at the end of the test, for interlayer adhesion, and for seal integrity along longitudinal lap seam 50. The testing showed that the lap seam remained in good condition, and the sheet material could not be separated at any interface between the foil layer 12 and outer composite / foil / 4147 ADH / polyester / 5133 ADH / EAA / ADH 500 / EVOH / ADH 500 / LLDPE / EAA /    (Experiment X)

A second, similar structure was made using a third polyester urethane curing adhesive, as follows:

the product contact LLDPE layer 16.

outer composite / foil / 7900 ADH / polyester / 7900 ADH / EAA / ADH 500 / EVOH / ADH 500 / LLDPE / EAA /    (Experiment Y)

Experiment AX was repeated as Experiment "AX-2" but the corona treatment was done out-of-line between the extrusion fabrication process and the extrusion lamination process.

Additional experiments were then conducted to further define the invention. Five layer structures representing layers 24, 20, 14, 18, and 16 were coextruded, with the same thicknesses as in Experiment AX, except as noted, in an air quenched tubular coextrusion process, generally described as "blown extrusion." Table 1 shows these additional structures, with processing and structural differences indicated.

Each 5-layer coextruded structure was extrusion laminated to the base sheet as illustrated in FIG. 1, using 0.05 mm. of EAA as the extrusion laminant, except as noted, all as previously described for Experiment AX. The base sheets in Experiments W, AT, and AU differed slightly from the others, but the differences were inconsequential to the results of the experimental testing for peel strength and lap seam integrity. The laminated base sheets were formed into lap seamed tubes as in FIGS. 1 and 3. Samples of the tubes filled with the methyl salicylate product were stored at different temperatures, typically 23° C., 41° C., and 49° C. The tubes were examined periodically for interfacial adhesion and lap seam integrity. Table 1 shows the results of the most severe test, namely at 49° C., except for Experiment AX-2 which represents 41° C. storage.

TABLE 1

| Experiment | Coextrusion Process | Coextruded Structure | Maleic anhydride in Adhesive Layers 18 and 20 | Ethylene Content in EVOH | Corona Treatment In-Line, Dynes | Corona Treatment at Extrusion Laminator | Comments | Peel Strength Instron, grams/cm · width 2 mths | 3 mths | 4 mths | Lap Seam Integrity |
|---|---|---|---|---|---|---|---|---|---|---|---|
| W | cast | EAA / Adh 500 / EVOH-DE / Adh 500 / LLDPE 2035 | 0.13% | 34% | yes | unknown | | D | — | — | — |
| AT | TWQ | LDPE / Adh 220 / EVOH-ET / Adh 220 / LDPE | 0.14% | 38% | yes | unknown | Foil staining after 3½ months storage | — | — | — | satisfactory |
| AU | TWQ | LDPE / Adh 220 / EVOH-ET / Adh 220 / LDPE | 0.14% | 38% | yes | unknown | Extrusion laminant was coextrusion of .038 mm. LDPE and 0.013 mm. EAA, with EAA toward the foil. staining after 3½ months storage. | — | — | — | satisfactory |
| AW | TWQ | LDPE / ADH 220 / EVOH-ET / ADH 220 / LLDPE 2056 | 0.14% | 38% | yes | yes | | NM | NM | 335 | good |
| AX | TWQ | LDPE / ADH 550 / EVOH-ET / Adh 550 / LLDPE 2056 | 0.32% | 38% | yes | yes | Peel Strength CN5 at both 6 weeks and 3 months | NM | CN5 | NM | good |
| AX-2 | TWQ | Same as AX | 0.32% | 38% | no | no | Corona treated to 42 dynes, out of line, between extrusion process and extrusion laminating process. Storage for test purposes was at 41° C. | NM | 236 | NM | |
| AZ | Blown | Same as AX | 0.32% | 38% | 38 | yes | | 441 | NM | 268 | good |
| BA | Blown | Same as AX | 0.32% | 38% | 38 | no | | 504 | NM | 311 | good |
| BB | Blown | Same as AX | 0.32% | 38% | no | yes | | 331 | NM | 181 | good |
| BC | Blown | LDPE / Adh 500 / EVOH-ET / Adh 500 / LLDPE 2056 | 0.13% | 38% | 38 | yes | | 382 | NM | 260 | good |

TABLE 1-continued

| Experiment | Coextrusion Process | Coextruded Structure | Maleic anhydride in Adhesive Layers 18 and 20 | Ethylene Content in EVOH | Corona Treatment In-Line, Dynes | Corona Treatment at Extrusion Laminator | Comments | Peel Strength Instron, grams/cm · width | | | Lap Seam Integrity |
|---|---|---|---|---|---|---|---|---|---|---|---|
| | | | | | | | | 2 mths | 3 mths | 4 mths | |
| BD | Blown | LDPE-EX / Adh 550 / EVOH-ET / Adh 550 / LLDPE-EX | 0.32% | 38% | 40 | yes | | 445 | NM | 283 | good |
| BE | Blown | LDPE-EX / Adh 550 / EVOH-ET / ADH 550 / LLDPE-EX | 0.32% | 38% | 41 | yes | Same as BD, except EVOH layer was 10% of thickness. LDPE Layer was 25% and LLDPE was 45%. | 409 | NM | 205 | good |
| BF | Blown | LDPE-EX / ADH 550 / EVOH-ET / Adh 550 / LLDPE-EX | 0.32% | 38% | 41 | yes | Same as BD, except EVOH layer was 30% of thickness. LDPE layer was 15%, and LLDPE layer was 35%. | 350 | NM | 228 | good |
| BG | Blown | LDPE-EX / ADH 550 / EVOH-N / Adh 550 / LLDPE-EX | 0.32% | 29% | 40 | yes | | 335 | NM | 268 | good |

D = Delaminated
NM = Not Measured
LDPE and LLDPE are from Dow Chemical Company except as noted
LDPE-EX and LLDPE-EX are from Exxon Chemical Company
TWQ = tubular water quench
Adh 220 has a low density polyethylene base resin.
Adh 500 and 550 have linear low density polyethylene base resins.
CNS = CANNOT SEPARATE The coextruded film can be as little as about 0.035 mm. thick, up to about 3 mm. thick, with a preferred range of about 0.05 mm. to about 0.75 mm. Flexible films are preferably up to about 0.25 mm. or 0.30 mm. thick.

The maleic anhydride content as reported herein is determined using Fourier Transform Infrared Spectroscopy. Samples are prepared by pressing the polymer pellets at 190° C. and 4000 psi for 2 minutes to produce a film approximately 0.15 mm. thick. The infrared spectrum in the region around 1790 cm$^{-1}$ is measured for each film and the absorbance of the 1790 band is recorded. The thickness of each sample film is measured and the ratio of absorbance at 1790 to thickness of the film is compared to a calibration curve produced using maleic anhydride standards.

Throughout this teaching, the anhydride content is taught in terms of the maleic anhydride content, since the preferred anhydride is maleic anhydride. It is contemplated that other anhydrides will function similar to maleic anhydride, so long as the layer composition contains an amount of active anhydride which is equivalent to the amount of anhydride contained in the recited amounts of maleic anhydride.

Sheet materials of the invention are capable of holding products containing active carboxy or sulfoxy groups, such as methyl salicylate, acetic anhydride, acetone, undecylenic acid, ichthamnol, and polyurethane prepolymers.

The fabrication of the sheet material of FIG. 1 requires some laminating processing. However, to the extent coextrusion processing can be used, the cost of the fabrication can be minimized. It is seen to be especially desirable to coextrude the 5-layer substructure comprising layers 14, 16, 18, 20, and 24. The specific materials for the several layers are chosen, within the family of resins disclosed for each recited layer, such that they will have rheological properties compatible with the coextrusion process. In that regard, it is desirable that the compositions of adhesive layers 18 and 20 have melt indexes, at 210° C., of between 3 and 9, preferably between 5 and 7.

A preferred process for coextrusion of the 5-layer substructure is a liquid quench coextrusion process, and preferably tubular water quench. The quench water temperature may be as high as 60° C., but is preferably lower, such as 30°-35° C.

Another, less preferred, process is the blown tubular coextrusion process wherein the extrudate is cooled by a gaseous medium such as room temperature air.

The outer surface of the LDPE layer which is to become layer 24 in the assembled sheet material is preferably corona treated in line with the coextrusion process, to a level of about 42-48 dynes. The sheet material of FIG. 1 is then assembled by lamination of the 5-layer coextruded film to the previously formed laminate (as seen in FIG. 1A) by combining the two subassemblies by heat and pressure in a hot nip.

In a less preferred process variation, the corona treatment may be omitted at the coextrusion step, and performed at another time prior to lamination, such as in-line with the hot nip lamination. However, this treatment process is less efficient than the preferred in-line treatment at the coextrusion step.

The EVOH of layer 14 has an ethylene content of no more than 45%, preferably at least 28%, most preferably at least 32%. While higher levels of ethylene in the EVOH make the composition more flexible and pliable, at least a part of the barrier property appears to be provided by the vinyl alcohol content, and thus at least 55% vinyl alcohol is preferred with a maximum vinyl alcohol content of about 72%, preferably about 64%, such that the EVOH composition will have facile processability in the extrusion process. Layer 20 is an adhesive composition having the capability to adhere EVOH layer 14 to LDPE layer 24. While it is desirable to have the composition of layer 20 be the same as the composition of layer 18, and same is most economical in provision of coextruded films as shown in FIG. 5, adhesive layer 20 may be selected to have a different composition. For example, adhesive layer 20 may have a lower anhydride modification level than layer 18, or it may have a different base resin composition such as LDPE, and especially different rheological properties, in order to improve its adhesion to layer 24.

Layer 26 is a primer which is applied to foil layer 12 in order to enhance the adhesion of the foil to the coextruded film. A preferred primer is the conventionally known chromium complexed polyacrylic acid primer. The EAA layer 22 serves the primary adhesion function between foil layer 12 (through primer layer 26) and LDPE layer 24 of the five layer coextruded film.

Referring now to the layers on the outside of the sheet structure from foil layer 12, and namely those layers between foil layer 12 and LDPE layer 32. While those layers are conventional in that they are used as the outer layers in conventional sheet materials used for making squeezable tubes, discussion of their purpose and function will aid in understanding the overall sheet structures of the preferred embodiments. Layer 28 provides an adhesive function to the foil similar to that of layer 22. LDPE layer 30 provides an adhesive function between layer 28 and paper layer 36, through PEI primer layer 38. PEI primer layer 40 is also functional in providing enhanced adhesion between paper layer 36 and LDPE layer 34. Typically, layer 34 is pigmented in order to give a desired color and appearance to the outer surface of the package. Finally, LDPE layer 32 is clear and provides the outer and glossy surface of the package.

The outer composite substructure, between layers 28 and 32, provides bulk, appearance, protection of foil layer 12 from physical abuse, and may provide some stiffness or other desirable physical properties to the package. Thus the substructure, including layers 30 and 32, and all the layers in between, could be replaced with other materials comprising one or more layers which provide the desirable functions and properties for the specific product application contemplated.

Turning now to FIGS. 2–4, it is seen that the sheet material shown in FIG. 1 may be used in fabrication of a tube having a lap seam 50 extending longitudinally along its length. The lap seam is formed by folding a portion of the sheet material onto itself such that a portion of an outside surface layer 32 on an underlying edge of the sheet material is in facing relationship with a portion of an inside surface layer 16 on an overlying portion of the sheet material at the location which forms the lap seam 50. The facing portions of the sheet material are then heated and pressed together such that the polymeric materials in the facing portions flow and bond to form the desired lap seam 50 as shown.

FIG. 4 shows the cross section of another exemplary package made using sheet materials of the invention. In this embodiment of the packages of the invention, portions of the sheet material 10 are brought into facing relationship to each other with the layer 16 of the corresponding facing portions toward the inside of the enclosure. Heat seals are then fabricated about contiguous portions of the facing portions of the sheet material to make the indicated fin seals 54 seen at FIG. 4.

FIG. 5 shows a less complex embodiment of the invention. This embodiment of the invention is useful where the extremely high barrier properties of the foil layer are not necessarily needed. Without the requirement for the foil layer, it is seen that the sheet material can be substantially less complex. Indeed, if covering layer 519 is polymeric, it is possible to make the sheet material at FIG. 5 by a one step process of coextrusion.

The functional barrier properties of the sheet material of FIG. 5 are generally provided by the EVOH layer 514, especially concerning barriers to transmission of oxygen and methyl salicylate. Layer 516 provides a substantial barrier to the transmission of moisture, having a moisture vapor transmission rate of no more than about 0.9 grams/645 $cm^2$-24 hours at 100% relative humidity. The composition of layer 516, as in layer 16, is preferably based on an olefin polymer or copolymer. A preferred olefin is an ethylene, as polymer or copolymer, but the composition may, alternatively, be based on propylene, butylene (including polyisobutylene) or a combination of the above; or other alpha olefins having a primary monomer containing at least three carbon atoms.

The composition of covering layer 519 may be selected with respect to its capability to serve as a barrier to transmission of a selected material. Its primary function, however, is usually that of protecting EVOH layer 514 from physical abuse when it is used as the outside layer of the package, and from physical attack by the components of the product when it is used toward the inside of the package from layer 514. Indeed, covering layer 519 may include a multiple layer structure including another adhesive layer, such as an adhesive polyethylene, especially a linear low density polyethylene, containing at least about 0.10%, preferably at least about 0.13%, most preferably at least about 0.20% maleic anhydride equivalent, adjacent EVOH layer 514, which represents the same anhydride criteria as for layers 18, 518, and 20. 519 may include other layers of materials which serve to protect or modify, or otherwise enhance, or make more effective, the properties of the EVOH. To that end, and especially with respect to using layer 516 toward the inside of the package, the sheet material of FIG. 5 is seen to be useful for packaging a variety of products which benefit from the barrier properties of EVOH, yet require substantial levels of adhesion between adhesive layer 518 and EVOH layer 514.

For purposes of this invention, it is necessary that the EVOH have a vinyl alcohol content of at least 55%, preferably at least 60%, in order to provide the primary barrier property to impede the transmission of the methyl salicylate product toward foil layer 12.

It is seen from the previous discussion that adhesive layer 18 includes a chemically modifying component of anhydride for provision of chemical bonding to the EVOH. It may also incorporate therein a material which provides for physical bonding as by a tackifying resin, such as one of the elastomers, which provides for a physical bonding property through tackiness. Typical of elastomers which may be incorporated into layer 18 are polyisobutylene, one of the styrene-blocked olefin copolymers such as styrene butadiene styrene copolymer or styrene ethylene butylene styrene copolymer, one of the diene modified olefins or rubbers such as ethylene propylene diene monomer terpolymer, an ethylene propylene copolymer such as ethylene propylene rubber, or the like. While low levels of elastomer additive will provide an advantage in some cases, usually 3% to 5% additive is needed in order to provide a discernible functional improvement. And while up to 25% additive may be used in some cases, usually there is no advantage in using more than 15%, so that is normally a practical upper limit. Layer 20 may be likewise modified.

Most preferred anhydride levels are about 0.26% to about 0.40%. Levels of 0.37% to 0.60% are acceptable for layers 18 and 20, but are not especially preferred. Layer 24 of LDPE is compatible with being adhesively bonded to layer 22 in an extrusion lamination process, as well as to bonding to the adhesive composition of layer 20 in the coextrusion process. Layers 22 and 24 could be combined, or their compositions could be changed, so long as they provide the desired adhesion, or the compatiblization of the adhesiveness between EVOH layer 14 and foil layer 12. Thus layer 24 could be EAA instead of the preferred LDPE, and layer 22 could be EMAA instead of the recited EAA; whereby it is seen that various combinations of materials could provide the desired adhesion.

Thus it is seen that the sheet materials of the invention provide the capability to package chemically aggressive products, including products containing highly volatile components, in flexible tube structures which are less subject to stress cracking, and are desirable for providing improved packaging structures. Such products include those containing methyl salicylate. It is also seen that the invention provides a multiple layer film comprising EVOH which is functional for providing a lesser degree of protection, in a much simpler structure, for products which are less demanding of the properties of the sheet material, while still providing excellent barrier in EVOH layer 514 to transmission of oxygen or methyl salicylate.

With the sheet materials of the illustrated embodiments having thus been disclosed, it is seen that several and various modifications may be made to the invention without departing from the spirit and scope of the concept. Thus the invention should be interpreted, not only with respect to the illustrated embodiments, but more appropriately in light of the appended claims.

Having thus disclosed the invention, what is claimed is:

1. A multiple layer sheet material, comprising:
   (a) a first layer of metal foil;
   (b) a second layer comprising ethylene vinyl alcohol copolymer having a first surface disposed toward said foil layer and a second surface disposed away from said foil layer; and
   (c) adhesive means between said first and second layers, said adhesive means comprising one or more layers having anhydride content equivalent to between about 0.10% and about 0.60% maleic anhydride.

2. A multiple layer sheet material as in claim 1 wherein said adhesive means comprises a layer having anhydride content equivalent to between about 0.13% and about 0.40% maleic anhydride.

3. A multiple layer sheet material as in claim 1 wherein said adhesive means comprises a layer having anhydride content equivalent to between about 0.26% and about 0.40% maleic anhydride.

4. A multiple layer sheet material as in any one of claims 1, 2, or 3, wherein said metal foil layer is adapted to serve as a barrier to transmission of volatile product components through said sheet material.

5. A multiple layer sheet material as in claim 1 and including protective means on a first surface of said foil layer, said first surface of said foil layer being disposed away from said ethylene vinyl alcohol copolymer layer, and a covering layer on said second surface of said ethylene vinyl alcohol layer.

6. A multiple layer sheet material as in claim 5 and including a layer of adhesive between said second layer and said covering layer and wherein said adhesive means includes a layer of adhesive disposed on said first surface of said second ethylene vinyl alcohol layer.

7. A multiple layer sheet material as in claim 6 wherein said layer of adhesive between said second layer and said covering layer comprises a base polymeric resin and anhydride comprising active anhydride component equivalent to between about 0.13% and about 0.40% maleic anhydride, said sheet material having interfacial adhesion between the pairs of said layers at the interfaces thereof, said sheet material being adapted to protect the interfacial adhesion between said layer of metal foil and said adhesive means from being attacked when the sheet is in the form of a package, by a packaged product having a component capable of attacking the interfacial adhesion therebetween, such that a package made with said sheet material is adapted to hold the product over the normal shelf life of the product.

8. A multiple layer sheet material as in claim 7 wherein the composition of said adhesive layer between said second layer and said covering layer has a melt index at 210° C., of between 3 and 9.

9. A multiple layer sheet material as in claim 6 wherein said ethylene vinyl alcohol in said second layer comprises about 55 mole percent to about 72 mole percent vinyl alcohol moieties.

10. A multiple layer sheet material as in claim 9 wherein said layer of adhesive between said second layer and said covering layer comprises a base polymeric resin and anhydride comprising active anhydride component equivalent to between about 0.10% and about 0.60% maleic anhydride.

11. A multiple layer sheet material as in claim 10 wherein the composition of said adhesive layer between said second layer and said covering layer has a melt index at 210° C., of between 3 and 9.

12. A multiple layer sheet material as in claim 6 wherein said layer of adhesive between said second layer and said covering layer comprises a base polymeric resin and anhydride comprising active anhydride component equivalent to between about 0.10% and about 0.60% maleic anhydride.

13. A multiple layer sheet material as in claim 12 wherein the composition of said adhesive layer between said second layer and said covering layer has a melt index, at 210° C., of between 3 and 9.

14. A multiple layer sheet material as in any one of claims 6-8 wherein the composition of said adhesive layer between said second layer and said covering layer includes a material which provides for physical bonding properties, in an amount up to 15% by weight.

15. A multiple layer sheet material as in claim 6, 9, 12, 7, or 13 wherein the composition of said adhesive layer on said first surface of said second layer comprises the composition of said adhesive layer between said second layer and said covering layer.

16. A multiple layer sheet material as in claim 6, 9, 12, 7, or 13 wherein the composition of said adhesive layer between said second layer and said covering layer includes a tackifying resin, in an amount up to 15% by weight, and wherein the composition of said adhesive layer on said first surface of said second layer comprises the composition of said adhesive layer between said second layer and said covering layer.

17. A multiple layer sheet material comprising a first layer of ethylene vinyl alcohol copolymer having first and second surfaces, a second covering layer on said first surface of said ethylene vinyl alcohol copolymer layer, an adhesive layer on said second surface of said ethylene vinyl alcohol copolymer layer, said adhesive layer comprising an ethylene polymer or copolymer component and an anhydride component comprising anhydride equivalent to about 0.10% to about 0.60% maleic anhydride, and having a melt index, at 210 degrees C., of between 3 and 9, and a layer of linear low density polyethylene on said adhesive layer opposite said first layer, said covering layer comprising low density polyethylene.

18. A multiple layer sheet material as in claim 17 wherein said adhesive layer on said second surface of said first layer comprises anhydride content equivalent to between about 0.13% and about 0.40% maleic anhydride.

19. A multiple layer sheet material as in claim 17 wherein said adhesive layer on said second surface of said first layer comprises anhydride content equivalent to between about 0.26% and about 0.40% maleic anhydride.

20. A multiple layer sheet material comprising a first layer of ethylene vinyl alcohol copolymer, a covering layer on a first side of said ethylene vinyl alcohol copolymer layer, a layer of an ethylene polymer or copolymer on a second side of said ethylene vinyl alcohol copolymer layer, an adhesive layer between said first layer and said layer of ethylene polymer or copolymer, the composition of said adhesive layer between said first layer and said layer of ethylene polymer or copolymer comprising active anhydride content equivalent to between about 0.10% and about 0.60% maleic anhydride.

21. A multiple layer sheet material as in claim 20 wherein said adhesive layer between said first layer and said layer of ethylene polymer or copolymer comprises anhydride content equivalent to between about 0.13% and about 0.40% maleic anhydride.

22. A multiple layer sheet material as in claim 20 wherein said adhesive layer between said first layer and said layer of ethylene polymer or copolymer comprises anhydride content equivalent to between about 0.26% and about 0.40% maleic anhydride.

* * * * *